June 10, 1969  E. M. SARRAF  3,448,974
SPACER FOR BASIC REFRACTORY BRICK IN
METALLURGICAL VESSELS
Filed Jan. 3, 1967

INVENTOR.
EDWARD M. SARRAF
BY
ATTORNEY

United States Patent Office 3,448,974
Patented June 10, 1969

3,448,974
SPACER FOR BASIC REFRACTORY BRICK IN
METALLURGICAL VESSELS
Edward M. Sarraf, 22290 Blossom Drive,
Rocky River, Ohio 44116
Filed Jan. 3, 1967, Ser. No. 606,897
Int. Cl. C21b 7/06; F27d 1/16; B32b 29/04
U.S. Cl. 266—43                           4 Claims

ABSTRACT OF THE DISCLOSURE

The present invention relates to a novel spacer for use between basic refractory brick in metallurgical vessels. The spacer consists of a sandwich having an inner core of metallic oxide material capable of reacting with the basic brick at elevated temperatures and an outer sheath of combustible material to allow for thermal expansion of the metallic oxide.

---

The metal encasement of basic refractory brick has been well known and extensively used in industrial furnaces. When a furnace constructed from metal encased brick is put in operation, the heat causes adjoining metal cases to oxidize and bond themselves together and to the basic refractory brick which they enclose. Recently, it has been found that metal encased brick have certain disadvantages which, in some instances, have led to resistance on the part of certain furnace users to employ such brick.

In an oxidizing furnace atmosphere, before the metal around the brick can achieve its main function in providing allowance for thermal expansion and in forming a refractory bond with the brick, the steel must first oxidize. The rate at which this oxidization takes place depends upon numerous factors, but as it takes place gradually from the hot face of the refractory in normal applications, the first step is a growth or an increase in volume of the steel plates, often as much as two or three times the original thickness. The growth creates pressure on the hot face of the refractory and may cause peeling or spalling to occur. This has been the usual explanation for the commonly observed fact that in metal encased basic open hearth roof construction, a spall frequently about ½ to 1 inch thick takes place on the hot face at around 20 or 25 heats.

This deficiency is even more pronounced with the growing use of direct bonded basic brick because of their greater hot strength and freedom from the reheat shrinkage of chemically bonded basic brick. These brick do not "give" and are, therefore, more susceptible to excessive hot face pressure, making the thickness of steel used in the metal casing much more critical to control.

In a reducing furnace atmosphere, it is frequently observed that the steel used for metal casing melts out of the joint and thus prevents a formation of the magnesio-ferrite bond.

In electric furnace roof application, which is on the verge of becoming an important use for basic brick, a different means of casing would be desirable if free from the electrical disadvantages of the soft steel normally used, such as, electrical conductivity, hysteresis effects, etc.

Accordingly, it is among the objects of the present invention to provide a new spacing means for use between basic refractory brick in metallurgical vessels that will serve the same function as the previously used steel encasement on said brick without encountering the disadvantages thereof.

Figure 1:
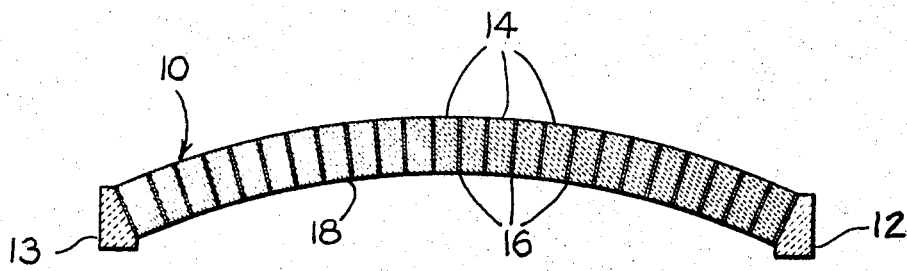
Figure 2:
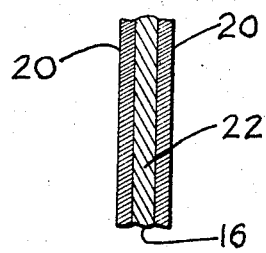

In order to more fully understand the nature and scope of the invention, reference should be had to the following detailed description and drawings, in which:

FIG. 1 is a cross-sectional view of the roof of an open hearth furnace containing the spacing means of the invention; and FIG. 2 is an isometric view of the sandwich-type spacer of the present invention.

In accordance with the present invention, there is provided a sandwich-type spaced for use between basic refractory brick in metallurgical vessels. The sandwich-type spacer consists of an inner core of metal oxide material capable of reacting with the basic refractory and an outer sheath of combustible material for allowing thermal expansion between the basic brick up to furnace operating temperature.

By basic refractory brick, it is intended to mean brick which consists essentially of magnesia, lime, chrome ore, or forsterite, or mixtures of two or more of these.

Since basic refractories are employed in the making of steel consist predominantly of magnesite, it is preferred that the metallic oxide core material be composed of iron oxide. Under oxidizing conditions, the metal is already in the oxide form and this facilitates bonding with the magnesia in the basic brick to form a magnesio-ferrite bond. Under reducing atmosphere conditions, the metal core in the oxide state will be difficult to reduce and prevent melting out of the joint between bricks. In both cases, the combustible sheath material serves to hold the core material in place as the furnace is brought up to operating conditions; it allows for expansion of the brick and core material without damaging the hot face of the brick; and then burns out to allow the oxide core material to form a bond with the brick.

As was stated, iron oxide is the preferred material for use in present applications and operating conditions. However, other metallic oxides such as alumina, chrome oxide and the like may be employed where furnace conditions warrant it.

The combustible material may consist of composite paper, board, cardboard and may be used in sheet form between courses of refractory, as strips between or fastened to individual brick or as a wrapping around individual brick similar to present metal casing.

The sandwich-type spacers may be fabricated in a number of ways. The sheet of combustible material may be disposed on a flat surface and the metal oxide material can be applied to the sheet in a relatively thin even layer, preferably automatically controlled, and another sheet of combustible material can be applied to the powdered oxide. The entire sandwich may then be lightly compressed for structural integrity and then cut up to the size required for a given application.

Another method would be to impregnate the inner surfaces of the composite paper with a metal oxide slurry and join them together with an adhesive for use. Still another method is to coat the inner surfaces of the combustible sheet material with an iron oxide mortar to form a sandwich. A suitable mortar for this purpose is disclosed in United States Patent No. 3,285,762, assigned to the present assignees. The thickness of the metal core and outer sheath will be apparent to those skilled in the art now employing metal encased refractory brick and, of course, will vary depending upon the particular application.

Referring now to FIG. 1, there is shown a cross-sectional view of a basic open hearth furnace roof 10, along with the front wall 12 and back wall 13. The roof is typical of an application for the present invention. As shown, the roof consists of a plurality of courses of basic refractory brick 14. In the joint between each of these brick is disposed the sandwich-type spacer 16 of the present invention. While the drawing shows the spacer to extend the entire length of the brick, it should be understood that it may be disposed only a portion of the length of the brick as long as the spacer eminates from the hot face 18.

FIG. 2 shows in detail the sandwich-type spacer 16 consisting of outer combustible sheath 20 and inner core metallic oxide material 22.

It is intended that the foregoing description and drawings be construed as illustrative and not in limitation of the present invention.

Having thus described the invention in detail, and with sufficient particularity as to enable those skilled in the art to practice it, what is desired to have protected by Letters Patent is set forth in the following claims.

I claim:

1. In a metallurgical vessel or furnace including support structure for refractory structure therein composed at least in part of basic refractory brick, the improvement comprising a sandwich-type spacer disposed between said basic refractory brick, said spacer consisting of an outer sheath of combustible material and an inner core of metallic oxide material, said metallic oxide material being capable of forming a bond with the basic refractory brick at operating temperatures.

2. The metallurgical vessel or furnace of claim 1 in which the basic brick and spacers therebetween are disposed in the roof thereof.

3. The vessel or furnace of claim 1 in which the core material is composed of iron oxide.

4. The vessel or furnace of claim 1 in which the outer sheath material is composed of composite paper.

References Cited

UNITED STATES PATENTS 2,861,793   11/1958   Roudabush.

J. SPENCER, OVERHOLSER, *Primary Examiner.*

EUGENE MAR, *Assistant Examiner.*

U.S. Cl. X.R.

263—46